United States Patent
Moradell-Casellas

(10) Patent No.: US 9,126,690 B2
(45) Date of Patent: Sep. 8, 2015

(54) NACELLE FOR AN AIRCRAFT ENGINE WITH CASCADE-TYPE THRUST REVERSER AND VARIABLE-GEOMETRY NOZZLE

(71) Applicant: AIRCELLE, Gonfreville L'Orcher (FR)

(72) Inventor: Pierre Moradell-Casellas, Saint Georges des Groseillers (FR)

(73) Assignee: AIRCELLE, Gonfreville L'Orcher (FR)

( * ) Notice: Subject to any disclaimer, the term of this patent is extended or adjusted under 35 U.S.C. 154(b) by 159 days.

(21) Appl. No.: 13/662,872

(22) Filed: Oct. 29, 2012

(65) Prior Publication Data

US 2013/0062435 A1    Mar. 14, 2013

Related U.S. Application Data

(63) Continuation of application No. PCT/FR2011/050627, filed on Mar. 24, 2011.

(30) Foreign Application Priority Data

Apr. 28, 2010   (FR) .................................... 10 53282

(51) Int. Cl.

| | |
|---|---|
| *F02K 1/76* | (2006.01) |
| *B64D 29/06* | (2006.01) |
| *F02K 1/09* | (2006.01) |
| F02K 3/075 | (2006.01) |
| F01D 15/10 | (2006.01) |

(52) U.S. Cl.
CPC . *B64D 29/06* (2013.01); *F02K 1/09* (2013.01); *F02K 1/763* (2013.01); *F01D 15/10* (2013.01); *F02K 3/075* (2013.01); *Y02T 50/671* (2013.01)

(58) Field of Classification Search
CPC ............. F02K 3/075; F02K 9/84; F02K 1/70; F02K 1/72; F02K 1/12; F02K 1/1223; F02K 1/763; Y02T 50/671; F02C 7/32; F01D 15/10; B64D 29/06

USPC .................. 60/226.2, 226.3, 771, 232, 39.15, 60/39.163, 802; 239/265.27, 265.31
See application file for complete search history.

(56) References Cited

U.S. PATENT DOCUMENTS 5,806,302 A   9/1998  Cariola
7,093,793 B2 * 8/2006  Lair ........................... 244/53 R
(Continued)

FOREIGN PATENT DOCUMENTS

| EP | 1978231 | 10/2008 |
|---|---|---|
| RU | 2 124 646 C1 | 1/1999 |
| WO | 2008045056 | 4/2008 |

OTHER PUBLICATIONS

PCT/FR2011/050627 International Search Report.

*Primary Examiner* — Craig Kim
(74) *Attorney, Agent, or Firm* — Brinks Gilson & Lione

(57) ABSTRACT

An aircraft engine nacelle is provided that includes a fixed front frame, a thrust reverser cowling mounted to slide with respect to the front frame between a direct-jet position and a reversed-jet position, a variable-geometry nozzle positioned in a downstream continuation of the reverser cowling, thrust-reversal jacks interposed between the front frame and the thrust-reverser cowling, adaptive nozzle jacks interposed between said thrust reverser cowling and the variable-geometry nozzle, drive shafts mounted on the front frame, transmission shafts extending along the thrust reverser cowling as far as the variable-geometry nozzle jacks, and mechanical means for coupling said transmission shafts to said drive shafts, and means for locking rotation of said transmission shafts before decoupling of the transmission shafts from their respective drive shafts, and when the decoupling is completed.

4 Claims, 2 Drawing Sheets

(56) References Cited

U.S. PATENT DOCUMENTS

Figure 1:
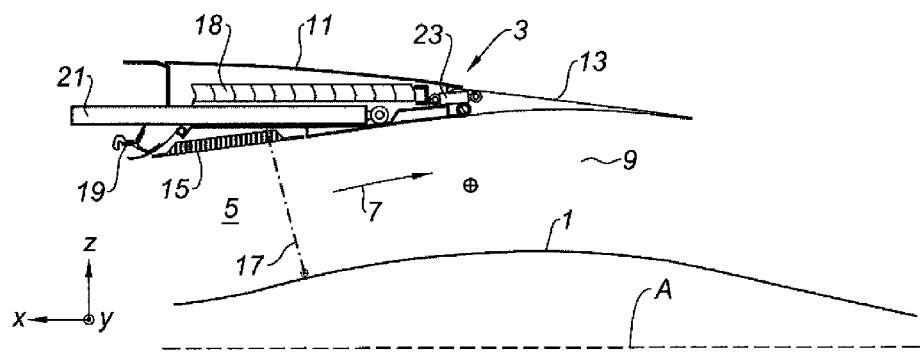

| | | | |
|---|---|---|---|
| 8,505,307 B2 * | 8/2013 | Wang | 60/771 |
| 8,511,973 B2 * | 8/2013 | Ramlaoui et al. | 415/144 |
| 2009/0013664 A1 * | 1/2009 | Jones et al. | 60/228 |
| 2010/0212287 A1 * | 8/2010 | Kubiak | 60/226.2 |
| 2014/0230584 A1 * | 8/2014 | Hudson et al. | 74/89.23 |

* cited by examiner

NACELLE FOR AN AIRCRAFT ENGINE WITH CASCADE-TYPE THRUST REVERSER AND VARIABLE-GEOMETRY NOZZLE

CROSS-REFERENCE TO RELATED APPLICATIONS

This application is a continuation of International Application No. PCT/FR2011/050627 filed on Mar. 24, 2011, which claims the benefit of FR 10/53282, filed on Apr. 28, 2010. The disclosures of the above applications are incorporated herein by reference.

FIELD

The present disclosure relates to a nacelle for an aircraft engine, with a variable-geometry nozzle.

BACKGROUND

The statements in this section merely provide background information related to the present disclosure and may not constitute prior art.

As is known in itself, an aircraft engine nacelle makes it possible to channel the outside air toward that engine, and to ensure the discharge of that air at a high speed so as to supply the necessary thrust.

In dual-flow turbojet engines, the flow of air mixed by the fan is divided, downstream thereof, into a primary flow (also called "hot") that enters the core of the turbojet engine to undergo several compressions and an expansion therein, and the secondary flow (also called "cold"), which circulates inside a substantially annular tunnel, defined on the one hand by an engine fairing (the internal fixed structure, also called "IFS"), and on the other hand by the thickness of the nacelle.

The flow of cold air, which exits downstream of the nacelle through an exhaust nozzle defined by the downstream edge of that nacelle, provides the majority of the thrust.

For aerodynamic optimization reasons, and thus fuel optimization reasons, it is completely advantageous to be able to adjust the section of the cold air flow discharge downstream of the nacelle: it is in fact useful to be able to increase that section during the takeoff and landing phases, and to reduce it during cruising phases: the term Variable Fan Nozzle (VFN) is often used.

It should be noted that this variable-geometry nozzle may be a single piece, or may be made up of two halves, or may be formed by juxtaposing deflector flaps: in the context of this document, the term "variable-geometry nozzle" will cover all possible scenarios.

Furthermore, as is known in itself, the nacelle very frequently incorporates thrust reversal means, which can move between a cruising position, also called "direct jet", and a thrust reversal position, also called "reverse jet," making it possible to orient part of the secondary flow of air in the upstream direction of the nacelle during landing, which actively contributes to the braking of the aircraft.

These thrust reversal means are often of the cascade vane type, i.e. they include a series of vanes arranged downstream of the fan case, on the periphery of the cold flow tunnel, said vanes being able to be uncovered on command by a thrust reverser cowling slidingly mounted on the structure of the nacelle.

The variable-geometry nozzle is situated in the downstream extension of the thrust reverser cowling, and it is important to be able to actuate these two parts of the nacelle independently: it is in particular desirable to be able to increase the cross-section of the variable-geometry nozzle without actuating the thrust reverser means, in particular during takeoff.

To perform this independent actuation, the prior art teaches the solution consisting of using dual-rod jacks (also called "telescoping"), one rod actuating the thrust reverser cowling, and the other rod actuating the variable-geometry nozzle.

Such jacks are heavy, and are also not suitable for the specific case of variable-geometry nozzles made up of pivoting deflector flaps: the pivoting of those flaps in fact tends to cause a misalignment of the rods of the jacks.

SUMMARY

The present disclosure thus in particular aims to provide a nacelle with a cascade-type reverser and a variable-geometry nozzle comprising independent actuating means for those members, wherein said actuating means are lighter than those of the prior art, and in particular adaptable to a variable-geometry nozzle made up of rotary deflector flaps.

This aim of the invention is achieved with an aircraft engine nacelle comprising:
  a fixed front frame,
  a thrust reverser cowling mounted to slide with respect to said front frame between a direct-jet position and a reversed-jet position,
  a variable-geometry nozzle positioned in the downstream continuation of this reverser cowling,
  thrust-reversal jacks interposed between said front frame and said thrust-reverser cowling,
  adaptive nozzle jacks interposed between said thrust reverser cowling and said variable-geometry nozzle,
  drive shafts mounted on said front frame,
  transmission shafts extending along said thrust reverser cowling as far as said variable-geometry nozzle jacks, and
  mechanical means for coupling said transmission shafts to said drive shafts, able to ensure the transmission of torque from said drive shafts to said transmission shafts when said cowling is in the direct-jet position, and to decouple the transmission shafts from the drive shafts when said cowling slides toward its reversed-jet position, and
  means for locking the rotation of said transmission shafts before the complete decoupling of those transmission shafts from their respective drive shafts, and when that decoupling is done.

Owing to these features, it is possible to actuate the variable-geometry nozzle independently of the thrust reverser when the latter is in the direct-jet position.

By accepting that the transmission shafts of the variable-geometry nozzle jacks disconnect from the drive shafts during thrust reversal, it is possible to do away with excessively long transmission means, which makes it possible to save weight compared to a solution with telescoping rod jacks.

Furthermore, by providing that the variable-geometry nozzle jacks can be actuated using transmission shafts that extend over the length of the thrust reverser cowling, it is possible to place those jacks downstream of said cowling, therefore closer to the variable-geometry nozzle, which makes it possible to use smaller jacks.

This also allows the use of variable-geometry nozzles with pivoting deflector flaps, since a misalignment of those jacks is possible in the area situated downstream of the thrust reverser cowling.

Additionally, the means for locking the rotation of the transmission shafts make it possible, once the decoupling is done, to prevent the variable-geometry nozzle from moving in an uncontrolled manner.

According to other optional features of this nacelle according to the present disclosure:

- said locking means are actuated under the effect of the separation of the thrust reverser cowling from said front frame when said cowling slides toward its reversed-jet position: owing to such locking means, no specific motorized locking device is necessary, which is in particular very advantageous in terms of maintenance;
- said locking means comprise, for each transmission shaft: jaw locking means, fixedly mounted on said thrust reverser cowling,
- a jaw drawer slidingly mounted and blocked in rotation in relation to the transmission shaft, said drawer comprising locking jaws on the one hand, able to cooperate with said locking means, and driving jaws on the other hand, able to cooperate with a toothed wheel driven by each respective drive shaft, and
- elastic return means for returning said jaw drawer toward said toothed wheel, the respective dimensions of these members being such that:

- when said reverser cowling is in the direct-jet position, said driving jaws cooperate with their associated toothed wheel, and
- when said reverser cowling moves away downstream of said front frame, said locking jaws engage with said locking means under the action of said elastic means before said driving jaws have escaped their associated toothed wheel.

These locking means, which have a very simple design, have a reduced bulk and weight, and are particularly easy to maintain.

According to still another optional feature, the variable-geometry nozzle of said nacelle is of the type having pivoting flaps.

DRAWINGS

Figure 2:
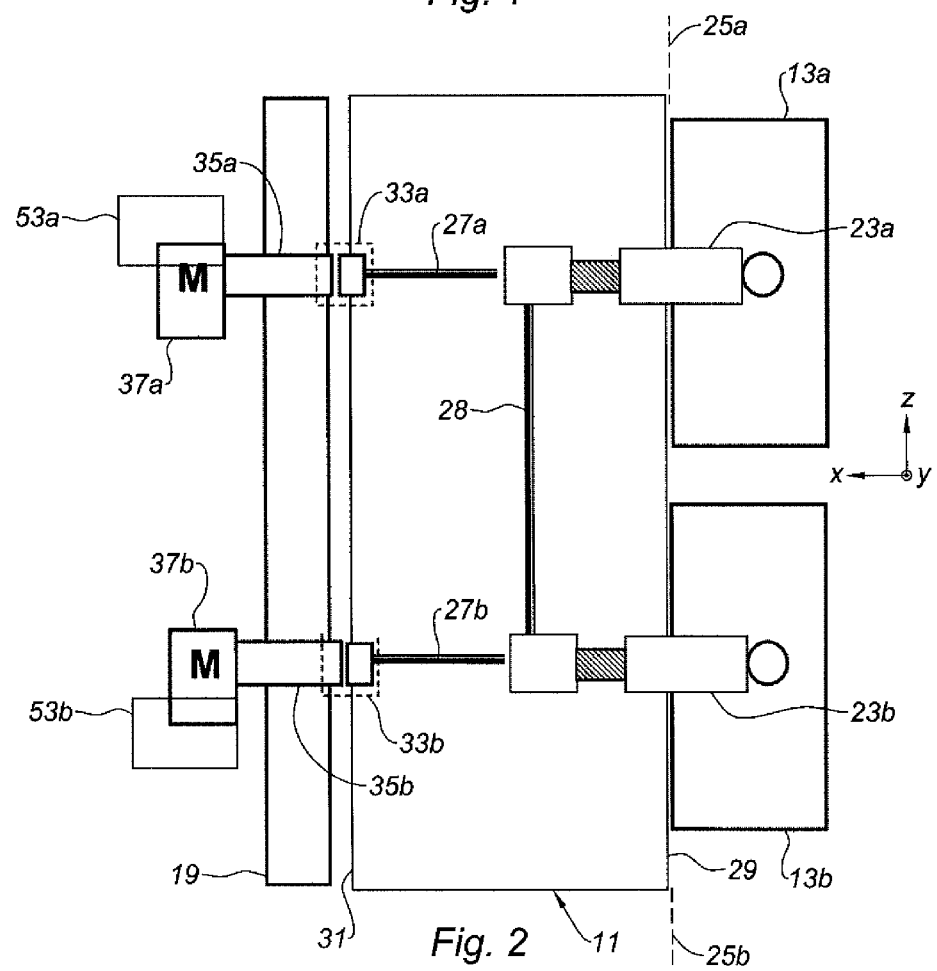
Figure 3:
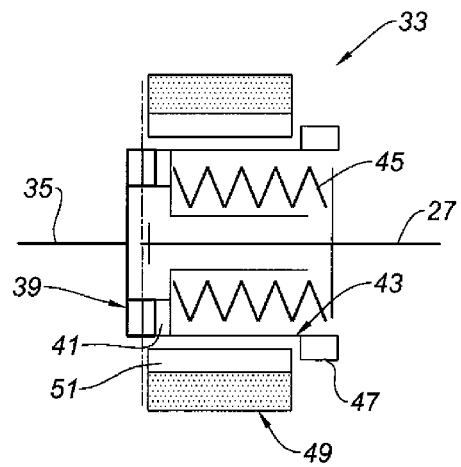
Figure 3:
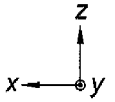
Figure 4:
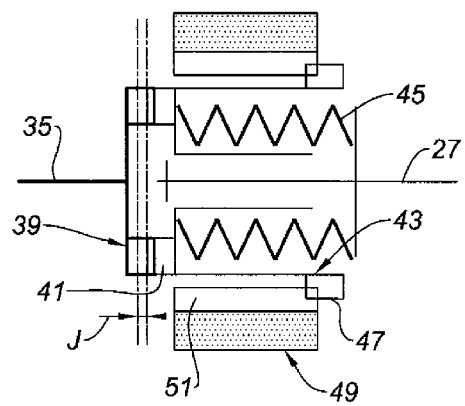
Figure 4:
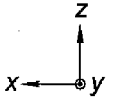
Figure 5:
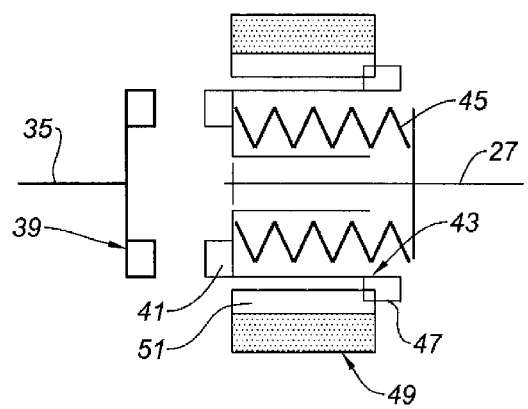
Figure 5:
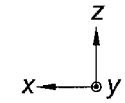

Other features and advantages of the present disclosure will appear in light of the following description, and upon examining the appended figures, in which:

FIG. 1 shows, in axial cross-section, the rear portion of the nacelle according to the present disclosure in the cruising configuration, FIG. 2 shows, in radial view in direction Y (see definition of that direction below), and diagrammatically, means for actuating the thrust reverser cowling and the variable-geometry nozzle, and FIGS. 3, 4 and 5 show, in the direct-jet, intermediate, and reversed-jet positions, respectively, and diagrammatically and in detail, the coupling means of FIG. 2.

In all of the figures, identical or similar references designate identical or similar members or groups of members.

A reference XYZ has been placed on all of these figures, the three axes of which respectively represent the longitudinal, transverse, and vertical directions of the nacelle, respectively.

It should be noted that the arrow of the X axis points in the upstream direction of the nacelle, this term being understood in relation to the flow of air intended to pass through the nacelle during operation.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

It will also be noted that the following description is focused more particularly on a rear nacelle portion, i.e. the portion of the nacelle situated downstream of the fan case, since that is where the invention is situated.

Reference will now be made to FIG. 1, which shows a rear nacelle portion according to the present disclosure in a cruising situation.

As shown in this FIG. 1, this rear nacelle portion includes an internal fixed structure 1, designed to fair a turbojet engine (not shown) centered around the axis a and a movable external structure 3, defining a secondary air flow, 5 in which a secondary flow of air 7 created by the fan (not shown) must circulate, and exiting through an outlet section 9 so as to provide thrust for the aircraft.

More specifically, the movable external structure 3 includes an upstream movable portion 11 forming a thrust reverser cowling, and a downstream movable portion 13 forming a variable-geometry nozzle.

On the thrust reverser cowling 11, thrust reverser flaps 15 are hingedly mounted, each connected to the internal fixed structure 1 by link rods 17.

Thrust reverser vanes 18 are mounted fixed on a front frame 19 with a substantially annular shape, which in turn is fixed downstream of the fan case (not shown).

Thrust reversal jacks 21, interposed between the (fixed) front frame 19 of the nacelle and the thrust reverser cowling 11, make it possible to slide said cowling in relation to the front frame between a direct-jet position (shown in FIG. 1) and a thrust reversal position, also called reverse-jet position (not shown).

In the cruising situation shown in FIG. 1, the thrust reverser cowling 11 covers the thrust reverser vanes 18, the thrust reverser vanes 15 being arranged in the extension of the thrust reverser cowling 11, so as to allow the free circulation of the cold air flow 7 in the tunnel 5.

To achieve the thrust reversal for landing, the thrust reverser cowling 11 slides downstream of the cascade vanes 18, causing the thrust reverser flaps 15 to pivot through the secondary flow tunnel 5, causing the deflection of the secondary air flow 7 to the vanes 18, toward the outside and the upstream direction of the nacelle.

Furthermore, jacks 23 for actuating the variable-geometry nozzle 13, inserted between the thrust reverser cowling 11 and said nozzle, make it possible to slide said nozzle between an upstream position in which the exhaust section 9 of the secondary air flow 7 is minimal (cruising situation shown in FIG. 1), and a downstream position in which said section is maximal (for takeoff and landing).

More specifically, as shown in FIG. 2, the variable-geometry nozzle 13 is in this case made up of a plurality of deflector flaps 13a, 13b, each rotatably mounted around respective axes 25a, 25b, transverse to the general axis of the nacelle A.

These deflector flaps 13a, 13b are respectively actuated by variable-geometry nozzle jacks 23a, 23b.

These jacks, which may be of the "ball screw" type known in itself, are actuated by respective transmission shafts 27a, 27b.

These transmission shafts may be flexible shafts of the "flexshaft" type, known in itself.

An interconnect shaft 28 may also be provided between the two jacks 23a, 23b.

The jacks 23a, 23b are placed near the downstream edge 29 of the thrust reverser cowling 11, and the transmission shafts 27a, 27b extend as far as the upstream edge 31 of that cowling.

Respective coupling means 33a, 33b make it possible to couple the transmission shafts 27a, 27b to respective drive shafts 35a, 35b, moved by respective motors 37a, 37b fixed on the front frame 19.

More specifically, the coupling means 33a, 33b allow the coupling and decoupling of the transmission shafts 27a, 27b with the drive shafts 35a, 35b, as a function of the position of the thrust reverser cowling 11, as will be explained hereafter.

Reference will now be made to FIGS. 3, 4 and 5, which diagrammatically show one of the coupling devices 33a, 33b, in the different configurations it may occupy.

As shown in FIG. 3, this coupling device comprises a toothed wheel secured in rotation to the drive shaft 35 on the one hand, and driving jaws 41 secured to a jaw drawer 43 on the other hand, which in turn is slidingly mounted on the transmission shaft 27, and blocked in rotation in relation to that shaft.

Elastic means that may comprise one or more springs 45 push the driving jaws 41 into contact with the toothed wheel 39, ensuring the transmission of torque between the drive shaft 35 and the transmission shaft 27 when the thrust reverser cowling 11 is in its upstream position, edge-to-edge with the fixed front frame 19 (direct-jet position).

Locking means are also provided: these means on the one hand comprise locking jaws 47 mounted on the jaw drawer 43, and on the other hand the means 49 for blocking the rotation of the locking jaws 47, said means 49 being able to include teeth 51 capable of cooperating with the locking jaws 47 under conditions that will be explained now.

When, from the cruising (direct-jet) position of FIG. 3, the thrust reverser jacks 21 are actuated (see FIG. 1) to slide the thrust reverser cowling 11 downstream of the fixed front frame 19, a longitudinal play J (i.e. a direction X) gradually appears between the toothed wheel 39 and the driving jaws 41: the elastic means 45 tend to fill in that play by pushing the jaw carriage 43 toward the toothed wheel 39, driving the engagement of the locking jaws 47 with the teeth 51 of the jaw blocking means 49, as shown in FIG. 4.

During this phase, the drive shaft 35 can no longer rotate the transmission shafts 27, which are locked.

This locking lasts while the thrust reverser cowling 11 continues to travel in the downstream direction of the nacelle, during which the driving jaws 41 escape the toothed wheel 39, as indicated in FIG. 5.

As one can see, owing to the coupling and locking system according to the present disclosure, it is possible to actuate deflector flaps 13a, 13b using variable-geometry nozzle jacks 23a, 23b when the thrust reverser cowling 11 is in the direct-jet position, then to keep those flaps 13a, 13b in the position thus adjusted when the thrust reverser cowling 11 slides toward its reversed-jet position.

This is made possible owing to the fact that the locking jaws 47 engage with the locking teeth 51 under the action of the elastic means 45 before the driving jaws 41 escape the toothed wheel 39.

The device according to the present disclosure therefore provides independent actuating means for the thrust reverser cowling 11 and the variable-geometry nozzle 13, without there being a need to provide bulky and expensive mechanisms of the telescoping jack type.

To facilitate the return to engagement of the driving jaws 41 with the toothed wheel 39, it is of course possible to provide that the respective profiles of said jaws and the teeth of the wheel 39 have the necessary slopes to facilitate their mutual engagement.

It will also be noted that respective brakes 53a, 53b are provided (see FIG. 2) for the motors 37a, 37b, making it possible to mobilize the variable-geometry nozzle 13 when the thrust reverser cowling 11 is in the direct-jet position, and therefore the locking jaws 47 are not engaged with the locking teeth 51.

Of course, the present invention is in no way limited to the embodiments described and shown, which are provided merely as examples.

What is claimed is:

1. An aircraft engine nacelle, comprising:
   a fixed front frame,
   a thrust reverser cowling mounted to slide with respect to said front frame between a direct-jet position and a reversed-jet position,
   a variable-geometry nozzle positioned in a downstream continuation of said thrust reverser cowling,
   thrust-reversal jacks interposed between said fixed front frame and said thrust-reverser cowling,
   variable-geometry nozzle jacks interposed between said thrust reverser cowling and said variable-geometry nozzle,
   drive shafts connected to and moved by motors mounted on said front frame,
   transmission shafts extending longitudinally along said thrust reverser cowling and directly connected to said variable-geometry nozzle jacks which they activate, and
   mechanical means for coupling said transmission shafts to said drive shafts, to transmit torque from said drive shafts to said transmission shafts when said cowling is in the direct-jet position, and to decouple the transmission shafts from the drive shafts when said cowling slides toward its reversed-jet position, and
   means for locking rotation of said transmission shafts before decoupling of the transmission shafts from their respective drive shafts, and when the decoupling is completed.

2. The nacelle according to claim 1, wherein said locking means are actuated under the effect of separation of the thrust reverser cowling from said fixed front frame when said thrust reverser cowling slides toward its reversed-jet position.

3. The nacelle according to claim 2, wherein said locking means comprise, for each transmission shaft:
   jaw locking means, fixedly mounted on said thrust reverser cowling,
   a jaw drawer slidingly mounted and blocked in rotation in relation to the transmission shaft, said jaw drawer comprising locking jaws, able to cooperate with said locking means, and driving jaws, able to cooperate with a toothed wheel driven by each respective drive shaft, and
   elastic return means for returning said jaw drawer toward said toothed wheel,
   the respective dimensions of the jaw locking means, the jaw drawer, and the elastic return means being such that:
   when said reverser cowling is in the direct-jet position, said driving jaws cooperate with their associated toothed wheel, and when said reverser cowling moves away downstream of said front frame, said locking jaws engage with said locking means under the action of said elastic means before said driving jaws have escaped their associated toothed wheel.

4. The nacelle according to claim 1, wherein the variable-geometry nozzle of said nacelle is of the type having pivoting flaps.

\* \* \* \* \*